United States Patent
McKinzie et al.

(10) Patent No.: US 11,613,246 B2
(45) Date of Patent: Mar. 28, 2023

(54) POWER CONTROL SYSTEM WITH ENGINE THROTTLE SHIFT FUNCTION

(71) Applicant: Deere & Company, Moline, IL (US)

(72) Inventors: Kyle K. McKinzie, Oswego, KS (US); Clayton G. Janasek, Independence, KS (US); Eric Vilar, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 105 days.

(21) Appl. No.: 17/154,729

(22) Filed: Jan. 21, 2021

(65) Prior Publication Data

US 2022/0227351 A1 Jul. 21, 2022

(51) Int. Cl.
*B60W 20/40* (2016.01)
*B60W 10/06* (2006.01)
*B60W 10/115* (2012.01)

(52) U.S. Cl.
CPC ............ *B60W 20/40* (2013.01); *B60W 10/06* (2013.01); *B60W 10/115* (2013.01); *B60W 2510/0638* (2013.01); *B60W 2710/0644* (2013.01)

(58) Field of Classification Search
CPC ...... B60W 20/40; B60W 10/02; B60W 10/06; B60W 10/08; B60W 10/10; B60W 10/115; B60W 2510/0638; B60W 2510/0644
See application file for complete search history.

(56) References Cited

U.S. PATENT DOCUMENTS

| | | | |
|---|---|---|---|
| 3,214,987 A | 11/1965 | Schenck et al. | |
| 3,626,787 A | 12/1971 | Singer | |
| 3,651,904 A | 3/1972 | Snoy et al. | |

(Continued)

FOREIGN PATENT DOCUMENTS

| | | |
|---|---|---|
| CN | 101255907 A | 9/2008 |
| CN | 102844588 A | 12/2012 |

(Continued)

OTHER PUBLICATIONS

USPTO, Final Office Action issued in U.S. Appl. No. 16/555,913 dated Apr. 20, 2021.

(Continued)

*Primary Examiner* — George C Jin
(74) *Attorney, Agent, or Firm* — Klintworth & Rozenblat IP LLP

(57) ABSTRACT

A control system for a work vehicle includes a power source with an engine and at least one motor configured to generate power; a transmission including a plurality of clutches configured for selective engagement to transfer the power to drive an output shaft of a powertrain of the work vehicle; and a controller coupled to the power source and the transmission. The controller has a processor and memory architecture configured to: initiate a transition for the transmission between a first transmission mode and a second transmission mode at a first shift point associated with an engine throttle shift function; determine a current engine speed; and generate and execute an engine speed command for the engine such that a commanded engine speed is a function of the current engine speed in accordance with the engine throttle shift function upon the transition of the transmission at the first shift point.

17 Claims, 5 Drawing Sheets

(56) References Cited

U.S. PATENT DOCUMENTS

| | | |
|---|---|---|
| 3,714,845 A | 2/1973 | Mooney, Jr. |
| 3,783,711 A | 1/1974 | Orshansky, Jr. |
| 4,090,414 A | 5/1978 | White |
| 4,164,155 A | 8/1979 | Reed et al. |
| 4,164,156 A | 8/1979 | Reed |
| 5,156,577 A | 10/1992 | Fredriksen et al. |
| 5,277,286 A | 1/1994 | Yamamoto et al. |
| 5,353,662 A | 10/1994 | Vaughters |
| 5,508,574 A | 4/1996 | Vlock |
| 5,931,757 A | 8/1999 | Schmidt |
| 6,254,509 B1 | 7/2001 | Meyer |
| 6,394,925 B1 | 5/2002 | Wontner et al. |
| 6,478,705 B1 | 11/2002 | Holmes et al. |
| 6,641,505 B2 | 11/2003 | Sayman et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan et al. |
| 7,479,081 B2 | 1/2009 | Holmes |
| 7,491,144 B2 | 2/2009 | Conlon |
| 7,611,433 B2 | 11/2009 | Forsyth |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,439,787 B2 | 5/2013 | Salamandra et al. |
| 8,469,127 B2 | 6/2013 | Tarasinski et al. |
| 8,500,585 B2 | 8/2013 | Kim et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,734,281 B2 | 5/2014 | Ai et al. |
| 8,747,266 B2 | 6/2014 | Aitzetmueller et al. |
| 8,784,246 B2 | 7/2014 | Treichel et al. |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 | 8/2015 | Dix et al. |
| 9,206,885 B2 | 12/2015 | Rekow et al. |
| 9,487,073 B2 | 11/2016 | Love et al. |
| 9,562,592 B2 | 2/2017 | Rekow et al. |
| 9,840,165 B2 | 12/2017 | Cox |
| 9,840,827 B2 | 12/2017 | Miyamoto et al. |
| 9,944,163 B2 | 4/2018 | McKinzie |
| 9,981,665 B2 | 5/2018 | Rekow et al. |
| 10,119,598 B2 | 11/2018 | Rekow et al. |
| 10,670,124 B2 | 6/2020 | Rekow et al. |
| 2001/0016536 A1* | 8/2001 | Minowa ............... B60K 6/48 180/65.23 |
| 2003/0186769 A1 | 10/2003 | Ai et al. |
| 2004/0094381 A1 | 5/2004 | Versteyhe |
| 2004/0172184 A1* | 9/2004 | Vukovich ........... F16H 61/688 192/3.51 |
| 2005/0036894 A1 | 2/2005 | Oguri |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2008/0171626 A1 | 7/2008 | Pollman |
| 2009/0250278 A1 | 10/2009 | Kawasaki et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller et al. |
| 2013/0023370 A1 | 1/2013 | Grad et al. |
| 2013/0123055 A1 | 5/2013 | Mattsson et al. |
| 2013/0173126 A1 | 7/2013 | Ruebsam |
| 2013/0211655 A1 | 8/2013 | Ogata et al. |
| 2013/0231815 A1* | 9/2013 | Tanishima ............ B60W 10/06 180/65.265 |
| 2013/0325238 A1* | 12/2013 | Kato .................... B60W 10/06 903/930 |
| 2014/0018201 A1 | 1/2014 | Tolksdorf |
| 2014/0248986 A1 | 4/2014 | Weeramantry et al. |
| 2014/0128196 A1 | 5/2014 | Rintoo |
| 2014/0128217 A1 | 5/2014 | Tabata et al. |
| 2014/0315685 A1 | 10/2014 | Hofler |
| 2015/0006007 A1 | 1/2015 | Kitahata et al. |
| 2015/0072823 A1 | 3/2015 | Rintoo |
| 2015/0142232 A1 | 5/2015 | Tabata et al. |
| 2015/0142282 A1* | 5/2015 | Lee ...................... B60W 30/19 701/58 |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2017/0102059 A1 | 4/2017 | Rekow et al. |
| 2017/0129477 A1* | 5/2017 | Ideshio ............... B60W 50/029 |
| 2017/0203646 A1 | 7/2017 | Mueller et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0022353 A1 | 1/2018 | Thompson et al. |
| 2018/0043764 A1 | 2/2018 | McKinzie et al. |
| 2018/0056982 A1* | 3/2018 | Endo .................... G05D 1/0248 |
| 2018/0149247 A1 | 5/2018 | Rekow et al. |
| 2018/0298993 A1 | 10/2018 | Fliearman et al. |
| 2019/0118642 A1 | 4/2019 | Cho et al. |
| 2019/0337376 A1 | 11/2019 | Ore |
| 2019/0344654 A1 | 11/2019 | Kaltenbach et al. |
| 2019/0346036 A1 | 11/2019 | Ore et al. |
| 2019/0389298 A1 | 12/2019 | Kaltenbach et al. |
| 2020/0309258 A1* | 10/2020 | McKinzie ............ F16H 61/04 |

FOREIGN PATENT DOCUMENTS

| | | |
|---|---|---|
| DE | 1173348 B | 7/1964 |
| DE | 4010919 A1 | 10/1991 |
| DE | 4131572 A1 | 3/1993 |
| DE | 19621200 A1 | 11/1997 |
| DE | 19954636 A1 | 5/2001 |
| DE | 201500200973 A1 | 5/2001 |
| DE | 10128076 A1 | 12/2002 |
| DE | 10319252 A1 | 11/2004 |
| DE | 102006041160 A1 | 9/2008 |
| DE | 202009007972 U1 | 5/2010 |
| DE | 11545 U1 | 12/2010 |
| DE | 102010026460 A1 | 3/2011 |
| DE | 102012216781 A1 | 3/2011 |
| DE | 102008032320 A1 | 6/2011 |
| DE | 102010021846 A1 | 12/2011 |
| DE | 10201102210 A1 | 7/2012 |
| DE | 102011102184 A1 | 7/2012 |
| DE | 112006002537 B4 | 8/2012 |
| DE | 10201105868 A1 | 1/2013 |
| DE | 102011115002 A1 | 4/2013 |
| DE | 102013009649 A1 | 12/2014 |
| DE | 102013220167 A1 | 4/2015 |
| DE | 202015102282 U1 | 5/2015 |
| DE | 102014225298 A1 | 7/2015 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016120965 A1 | 5/2017 |
| DE | 102016204727 A1 | 9/2017 |
| DE | 102018108510 A1 | 10/2018 |

(56) References Cited

FOREIGN PATENT DOCUMENTS

| | | | |
|---|---|---|---|
| DE | 102018209940 A1 | 12/2018 |
| DE | 102018212712 A1 | 1/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020215219 A1 | 6/2021 |
| EP | 01099882 A2 | 10/1991 |
| EP | 805059 A2 | 11/1997 |
| EP | 01707416 | 8/2007 |
| EP | 02855226 | 8/2007 |
| EP | 02466168 | 6/2012 |
| EP | 02466169 | 6/2012 |
| EP | 2682531 A1 | 8/2014 |
| EP | 2832567 A1 | 4/2015 |
| EP | 2631144 | 9/2015 |
| JP | 6462174 B1 | 1/2019 |
| WO | 2007017975 A1 | 2/2007 |
| WO | 2008019799 A2 | 2/2008 |
| WO | 2011092643 A1 | 8/2011 |
| WO | 2012171812 A1 | 12/2012 |
| WO | 2017107848 A1 | 6/2017 |

OTHER PUBLICATIONS

German Search Report issued in application No. DE102021209495.3 with translation, dated Jan. 11, 2022 (24 pages).
German Search Report issued in counterpart application No. 102020209003.3 dated Jul. 17, 2021 (10 pages).
USPTO, Non-Final Office Action issued in U.S. Appl. No. 17/066,746 dated Oct. 26, 2021.
German Search Report issued in application No. 102020213675.0 dated Mar. 17, 2021. (10 pages).
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
CNIPA Office Action for Application No. 201510165982.4 dated Aug. 9, 2018, Serial Notice No. 2018080601675890.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
German Search Report for application No. 102019205211 dated Sep. 5, 2019.
German Search Report for application No. 102019204706 dated Dec. 17, 2019.
German Search Report for German application No. 1020202026513 dated Sep. 1, 2020.
Deere & Company, Utility U.S. Appl. No. 16/670,210, filed Oct. 31, 2019.
Deere & Company, Utility U.S. Appl. No. 16/555,913, filed Aug. 29, 2019.
Deere & Company, Utility U.S. Appl. No. 16/946,685, filed Jul. 1, 2020.
USPTO, Office Action in U.S. Appl. No. 14/249,258 dated Apr. 21, 2017.
USPTO, Office Action in U.S. Appl. No. 14/249,258 dated Aug. 22, 2017.
USPTO, Office Action in U.S. Appl. No. 14/249,258 dated Oct. 17, 2016.
USPTO, Office Action in U.S. Appl. No. 14/536,097 dated Sep. 25, 2017.
USPTO, Office Action in U.S. Appl. No. 15/664,289 dated Jul. 26, 2018.
USPTO, Office Action in U.S. Appl. No. 15/664,289 dated Dec. 13, 2018.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in U.S. Appl. No. 15/628,979 dated Nov. 5, 2019.
USPTO, Office Action in pending U.S. Appl. No. 15/971,867 dated Dec. 12, 2019.
USPTO, Office Action in U.S. Appl. No. 16/371,598 dated Jul. 21, 2020.
USPTO, Final Office Action in U.S. Appl. No. 15/971,867 dated Jun. 24, 2020.
USPTO, Non-Final Office Action issued in U.S. Appl. No. 16/555,913 dated Jan. 4, 2021.
Deere & Company, Utility U.S. Appl. No. 17/066,746, filed Oct. 9, 2020.
German Search Report issued in counterpart application No. 102017220666.7 dated May 28, 2021 (10 pages).
Extended European Search Report issued in counterpart application No. 20205965.5 dated Jul. 28, 2021 (10 pages).
USPTO, Ex Parte Quayle Action issued in U.S. Appl. No. 17/171,856 on Oct. 11, 2022.
German Search Report issued in application No. DE102021214746.1 with translation, dated Jun. 30, 2022. (25 pages).
USPTO, Non-Final Office Action issued in U.S. Appl. No. 17/559,496 dated Aug. 31, 2022.
USPTO, Non-Final Office Action issued in U.S. Appl. No. 17/538,691 dated Sep. 15, 2022.
German Search Report issued in application No. DE102021212506.9 dated Jun. 20, 2022 (12 pages).

* cited by examiner

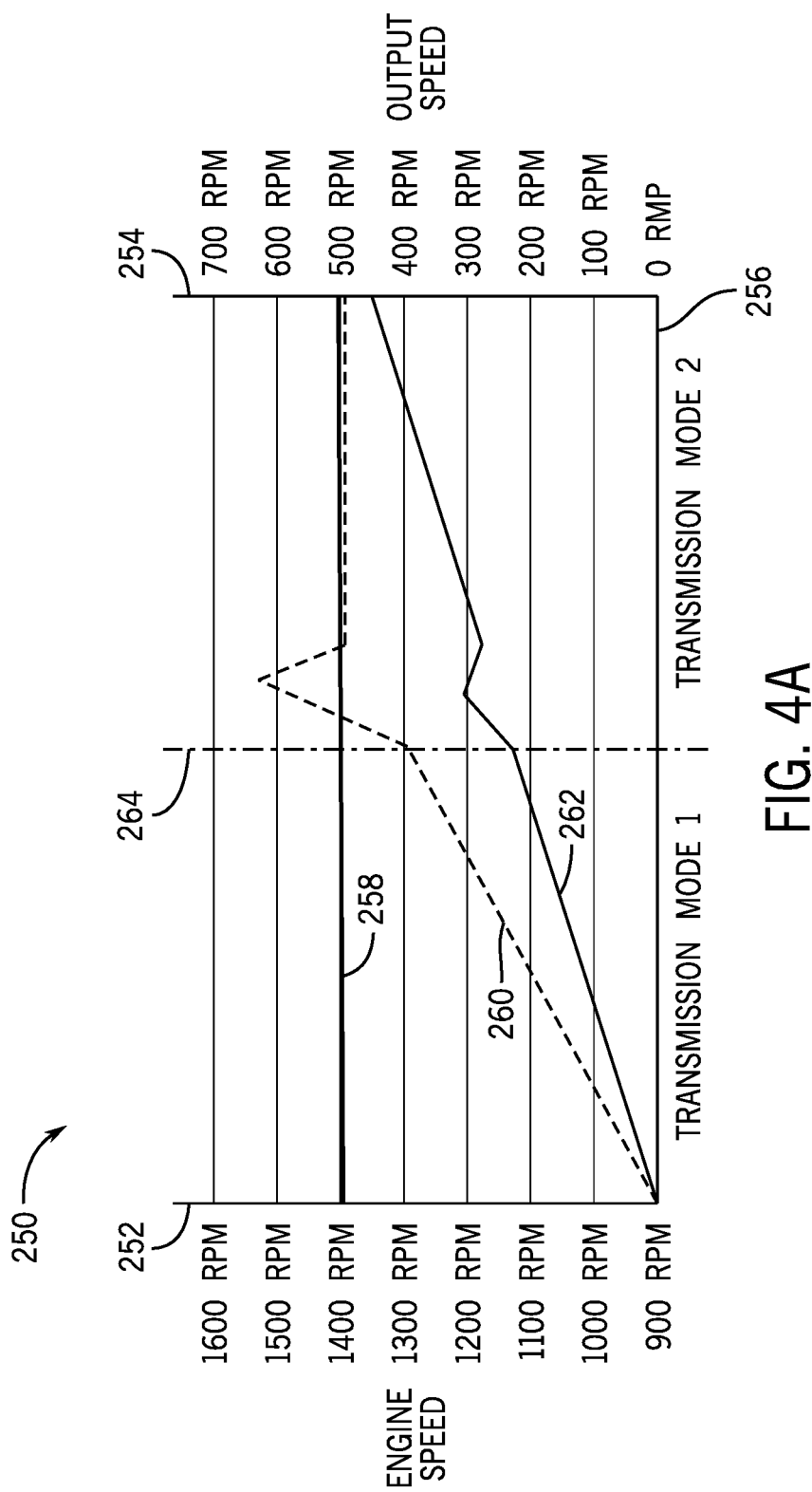

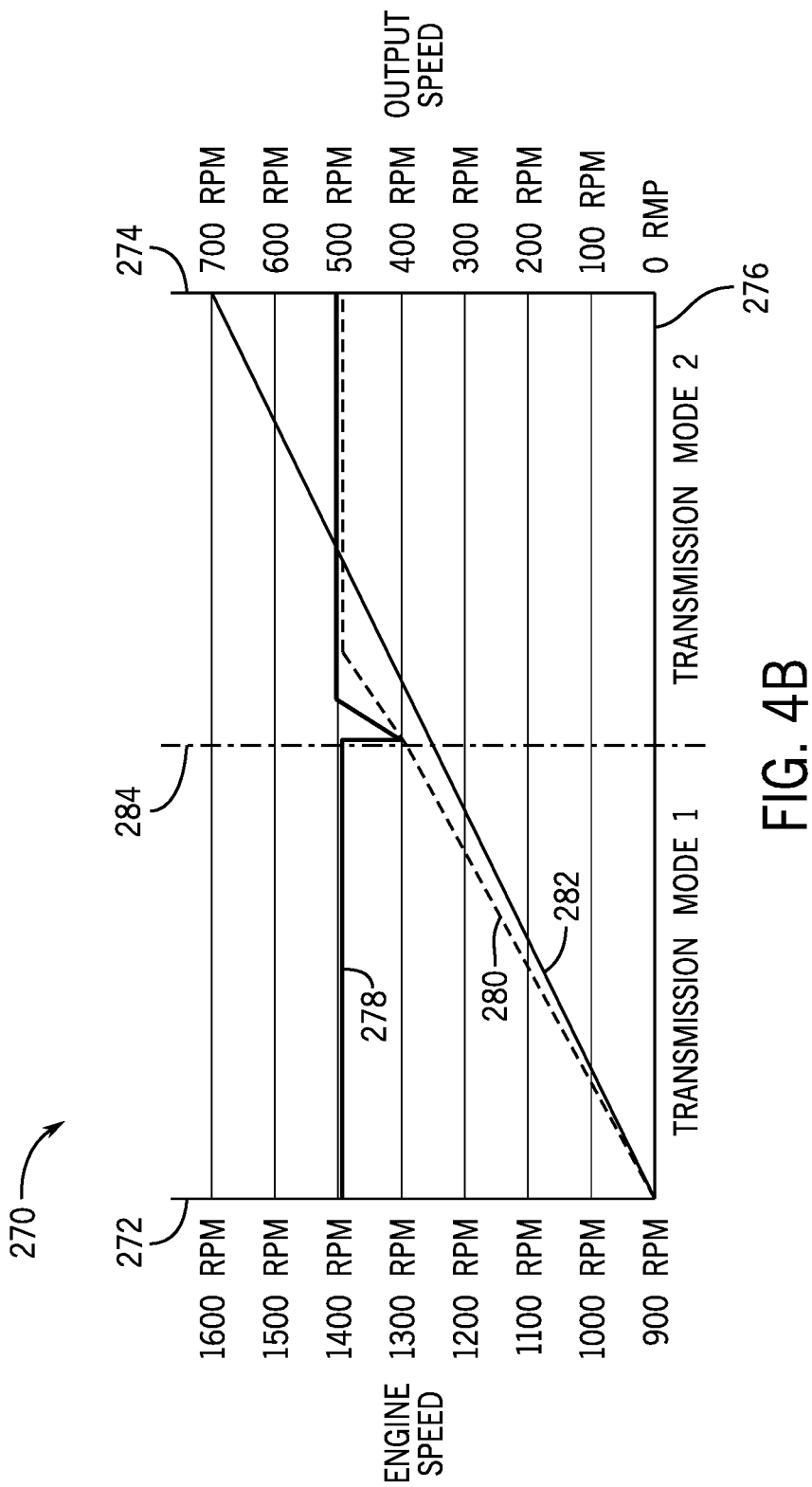

POWER CONTROL SYSTEM WITH ENGINE THROTTLE SHIFT FUNCTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a control system for a work vehicle, and more specifically to a power control system for a transmission and an engine of the work vehicle.

BACKGROUND OF THE DISCLOSURE

In the agriculture, construction and forestry industries, work vehicles, including wheel loaders, may be utilized to perform a number of different tasks. Modern work vehicles may use both a traditional engine (e.g., an internal combustion engine) and one or more continuously variable power sources (CVP) (e.g., an electric motor/generator or hydraulic motor/pump, and so on) to provide useful power. In various applications, the powertrain of the work vehicle may use power selectively provided solely by either power source or in combined form via an infinitely variable transmission ("IVT") or continuously variable transmission ("CVT") according to modes. Moreover, each mode may have one or more gear (or speed) ratios as clutches are selectively engaged and disengaged to vary the power flow path. Manipulation of the power flow between modes and/or between gear ratios occurs at transitions or "shift points" that may involve a number of dynamic forces that potentially impact vehicle performance and operator feel.

SUMMARY OF THE DISCLOSURE

The disclosure provides a power control system for a work vehicle.

In one aspect, the disclosure provides a control system for a work vehicle including a power source including an engine and at least one motor configured to generate power; a transmission including a plurality of clutches coupled together and configured for selective engagement to transfer the power from the engine and the at least one motor to drive an output shaft of a powertrain of the work vehicle according to a plurality of transmission modes; and a controller coupled to the power source and the transmission. The controller has a processor and memory architecture configured to: initiate a transition for the transmission between a first transmission mode and a second transmission mode at a first shift point associated with an engine throttle shift function; determine a current engine speed; and generate and execute an engine speed command for the engine such that a commanded engine speed is a function of the current engine speed in accordance with the engine throttle shift function upon the transition of the transmission at the first shift point.

In another aspect, the disclosure provides a controller for a work vehicle with an engine and at least one motor configured to generate power and a transmission configured to transfer the power from the engine and the at least one motor to drive an output shaft of the work vehicle. The controller includes a processor and memory architecture configured to initiate a transition for the transmission between a first transmission mode and a second transmission mode at a first shift point associated with an engine throttle shift function; determine a current engine speed; and generate and execute an engine speed command for the engine such that a commanded engine speed is a function of the current engine speed in accordance with the engine throttle shift function upon the transition of the transmission at the first shift point.

In a further aspect, the disclosure provides a method of operating a powertrain of a work vehicle with an engine and at least one motor configured to generate power and a transmission configured to transfer the power from the engine and the at least one motor to drive an output shaft of the work vehicle. The method includes initiating, with a controller, a transition for the transmission between a first transmission mode and a second transmission mode at a first shift point associated with an engine throttle shift function; determining, at the controller, a current engine speed; and generating and executing, at the controller, an engine speed command for the engine such that a commanded engine speed is a function of the current engine speed in accordance with the engine throttle shift function upon the transition of the transmission at the first shift point.

The details of one or more embodiments are set forth in the accompanying drawings and the description below. Other features and advantages will become apparent from the description, the drawings, and the claims.

BRIEF DESCRIPTION OF THE DRAWINGS

FIG. 4A is a data representation of various parameters during operation of the engine throttle shift function in accordance with an example embodiment; and FIG. 4B is a data representation of various parameters without operation of the engine throttle shift function.

Like reference symbols in the various drawings indicate like elements.

DETAILED DESCRIPTION

Figure 1:
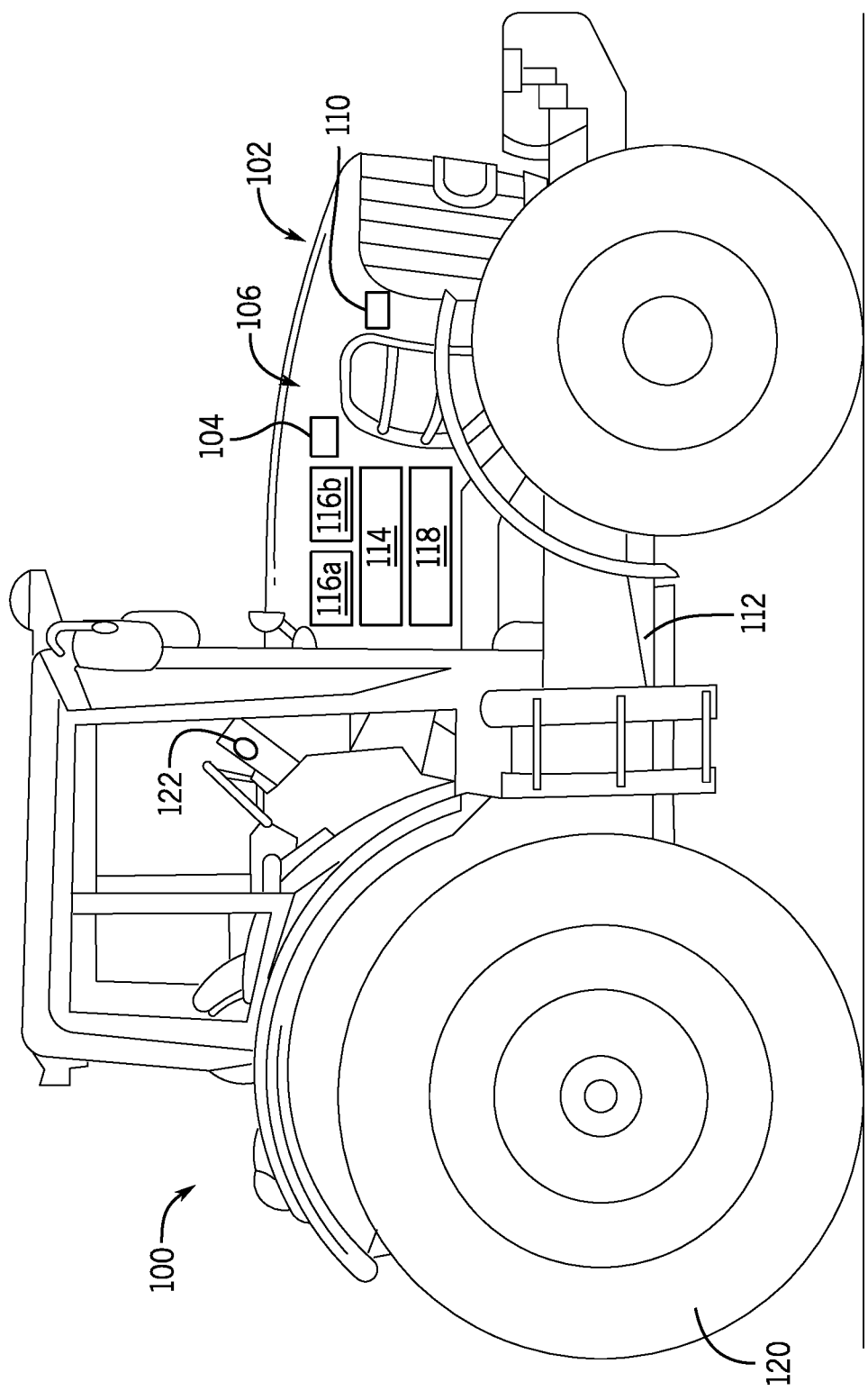
FIG. 1 is a side view of an example work vehicle that uses a power control system having an engine throttle shift function in accordance with an example embodiment of this disclosure.

The following describes one or more example embodiments of the disclosed power control system, powertrain, or vehicle, as shown in the accompanying figures of the drawings described briefly above. Various modifications to the example embodiments may be contemplated by one of skill in the art.

Typically, work vehicles, such as those in the agriculture, construction and forestry industries, may include a power control system implemented with a powertrain having an engine and one or more additional power sources, such as one or more motors, that individually and collectively provide power via a transmission to drive the vehicle and perform work functions. For example, the power control system may implement one or more split modes in which power from the engine and motor are combined in the transmission to provide output torque; one or more direct drive modes in which power from only the engine provides the output torque; and one or more series modes in which power from primarily the motor provides the output torque. Such a transmission may be considered a hybrid transmission, an infinitely variable transmission (IVT), or an electrical infinitely variable transmission (eIVT); and such a powertrain may be considered a hybrid, IVT, or eIVT powertrain. Within each mode, the clutches of the transmission may be manipulated to provide or more gear or speed ratios, each at a "shift point."

During typical operation, the power control system may command an engine speed that is higher than the current engine speed, particularly when the transmission is being upshifted. However, at certain shift points, attempting to increase engine speed may result in non-synchronous speeds at the clutch elements within the transmission. In some situations, the impact of these disparate speeds is exacerbated at shift points in which the transmission has high internal inertia. In these situations, the internal inertia may be reflected from the transmission at the engine to, in effect, spike the speed of the engine, which will then be transferred back through the transmission to the output at the wheels. In other words, some transmissions at certain shift points may experience lugging and a spike in acceleration that impacts the "shift quality" and is noticeable with respect to performance and feel.

However, according to the present disclosure, the power control system is configured to implement an engine throttle shift function at one or more shift points to suitably address the potential impact of internal inertia in the transmission that would otherwise impact performance or feel. In one example, a selected shift point associated with the engine throttle shift function may include a shift point in which the transmission transitions from a series mode to a split path mode. In accordance with the engine shift throttle function, the power control system generates an engine speed command according to the engine throttle shift function based on the actual or current engine speed; and in particular, the power control system may generate an engine speed command that is equal to the current engine speed. In effect, the engine is "throttled" or de-fueled to avoid an increase in engine speed during the shift, thereby avoiding acceleration within the transmission that otherwise impacts shift quality, performance, and feel.

As such, the engine speed commands generated by the power control system may be modified or varied based on whether or not the engine throttle shift function is being implemented (e.g., whether or not the shift point is associated with the engine throttle shift function). If the engine throttle shift function is not designated, the power control system generates the engine speed commands in a typical manner, e.g., according to predetermined speed schedules with target or "final" speeds for a mode. However, if the engine throttle shift function is implemented, the power control system generates the engine speed commands based on the current engine speed. In one example, the engine control module generates engine speed commands to set the engine speed to be equal to the current engine speed during implementation of the engine throttle shift function. Typically, this is a lower engine speed than would be otherwise commanded without the engine throttle shift function. Additional details will be provided below.

Referring to FIG. 1, a work vehicle 100 may include or otherwise implement a power control system 102 that executes an engine throttle shift function to ensure consistent and smooth operation of the work vehicle 100. The view of FIG. 1 generally reflects the work vehicle 100 as a tractor. It will be understood, however, that other configurations in the agricultural, construction, and/or forestry industries may be possible, including configurations as a wheel loader. It will further be understood that the disclosed powertrain 106 may also be used in non-work vehicles and non-vehicle applications (e.g., fixed-location power installations). In one example, the power control system 102 may be considered to include or otherwise interact with a controller 104, a powertrain 106, and one or more sensors 110 supported on the chassis 112 of the work vehicle 100.

Generally, the powertrain 106 includes one or more sources of power, such as an engine 114 (e.g., a diesel engine) and/or one or more continuously variable power sources (CVPs) 116a, 116b (e.g., one or more electrical and/or hydraulic motors), as well as various batteries and power transfer elements. The powertrain 106 further includes a transmission 118 that transfers power from the power sources 114, 116a, 116b to a suitable driveline coupled to one or more driven wheels 120 to enable propulsion of the work vehicle 100. The transmission 118 may also supply power to drive other vehicle systems, components, or implements. The transmission 118 may include various gears, shafts, clutches, and other power transfer elements that may be operated in a variety of ranges representing selected output speeds and/or torques. As described in greater detail below, the power control system 102 is used to implement the engine throttle shift function at one or more shift points (e.g., at transitions between ranges and/or power sources) within the transmission 118.

Generally, the controller 104 implements operation of the power control system 102, powertrain 106, and other aspects of the vehicle 100, including any of the functions described herein. The controller 104 may be configured as computing devices with associated processor devices and memory architectures, as hydraulic, electrical or electro-hydraulic controllers, or otherwise. As such, the controller 104 may be configured to execute various computational and control functionality with respect to the vehicle 100. The controller 104 may be in electronic, hydraulic, or other communication with various other systems or devices of the vehicle 100, including via a CAN bus (not shown). For example, the controller 104 may be in electronic or hydraulic communication with various actuators, sensors, and other devices within (or outside of) the vehicle 100.

In some embodiments, the controller 104 may be configured to receive input commands and to interface with an operator via a human-machine interface or operator interface 122, including typical steering, acceleration, velocity, transmission, and wheel braking controls, as well as other suitable controls. The human-machine interface 122 may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices. The controller 104 may also receive inputs from one or more sensors 110 associated with the various system and components of the work vehicle 100, as discussed in greater detail below. As also discussed below, the controller 104 may implement the power control system 102 based on these inputs to generate suitable commands for the powertrain 106, particularly with respect to the engine throttle shift function.

As noted above, the work vehicle 100 may include one or more sensors (generally represented by sensor 110) in communication to provide various types of feedback and data with the controller 104 in order to implement the functions described herein, as well as functions typical for a work vehicle 100. In certain applications, sensors 110 may be provided to observe various conditions associated with the work vehicle 100. In one example, the sensors 110 may provide information associated with the power control system 102 to implement the engine throttle shift function. The sensors 110 may include kinematic sensors that collect information associated with the position and/or movement of the work vehicle 100, such as one or more directional sensors and/or one or more ground speed sensors. Additional sensors (or otherwise, sources or data) may provide or include sources of powertrain data, including data sufficient to determine the current or anticipated mode of the transmission 118, information associated with the positions of one or more transmission clutch elements, torque and/or speed information associated with the CVPs 116a, 116b, engine 114, and/or elements of the transmission 118. In particular, the sensors 110 may collect information associated with the current engine speed, e.g., directly or derived from other parameters.

As described in greater detail below, the power control system 102 operates to implement the engine throttle shift function. The engine throttle shift function is particularly useful in a hybrid powertrain system (e.g., with CVP and engine power sources). An example powertrain 106 is depicted and discussed below with reference to FIG. 2 as implementing aspects of the power control system 102, and subsequently, additional details about the power control system 102 implementing the engine throttle shift function are provided with reference to FIG. 3.

Figure 2:
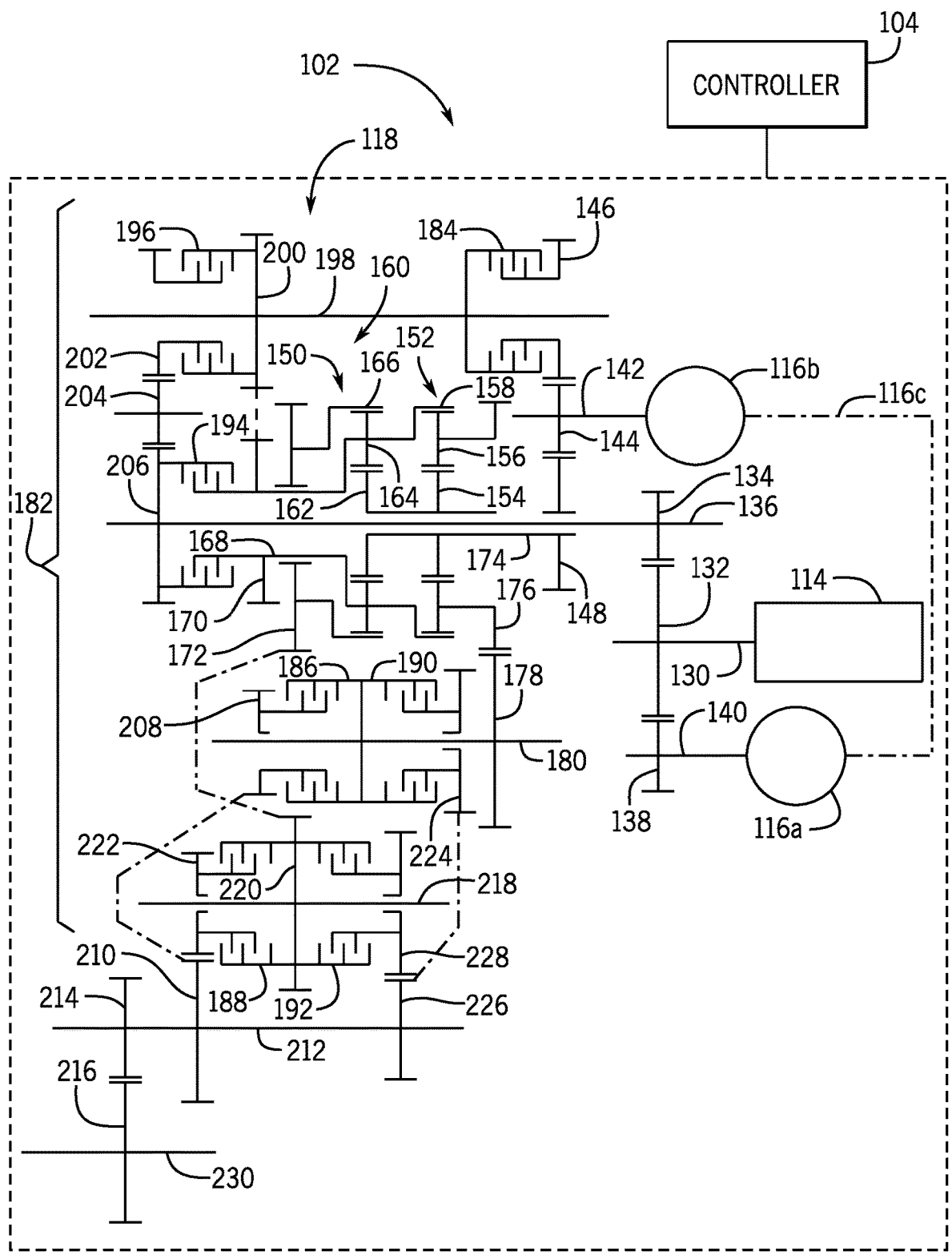
FIG. 2 is a powertrain for implementing the power control system of the example work vehicle of FIG. 1 in accordance with an example embodiment.

Referring to FIG. 2 and as introduced above, the power control system 102 may be considered to include powertrain 106 and the controller 104, which is in communication with the various components of the powertrain 106 and additionally receives information from various vehicle systems and/or sensors 110 (FIG. 1). As also noted above, the powertrain 106 may include one or more power sources 114, 116a, 116b. In particular, the powertrain 106 may include the engine 114, which may be an internal combustion engine of various known configurations; and further the powertrain 106 may also include the first CVP 116a (e.g., an electrical or hydraulic motor) and the second CVP 116b (e.g., an electrical or hydraulic motor), which may be connected together by a conduit 116c (e.g., an electrical or hydraulic conduit). The powertrain 106 includes the transmission 118 that transfers power from the engine 114, first CVP 116a, and/or second CVP 116b to an output shaft 230. As described below, the transmission 118 includes a number of gearing, clutch, and control assemblies to suitably drive the output shaft 230 at different speeds in multiple directions. Generally, in one example, the transmission 118 of powertrain 106 for implementing the power control system 102 may be any type of infinitely variable transmission arrangement.

The engine 114 may provide rotational power via an engine output element, such as a flywheel, to an engine shaft 130 according to commands from the controller 104 based on the desired operation. The engine shaft 130 may be configured to provide rotational power to a gear 132. The gear 132 may be enmeshed with a gear 134, which may be supported on (e.g., fixed to) a shaft 136. The shaft 136 may be substantially parallel to and spaced apart from the engine shaft 130. The shaft 136 may support various components of the powertrain 106 as will be discussed in detail.

The gear 132 may also be enmeshed with a gear 138, which is supported on (e.g., fixed to) a shaft 140. The shaft 140 may be substantially parallel to and spaced apart from the engine shaft 130, and the shaft 140 may be connected to the first CVP 116a. Accordingly, mechanical power from the engine (i.e., engine power) may transfer via the engine shaft 130, to the enmeshed gears 132, 138, to the shaft 140, and to the first CVP 116a. The first CVP 116a may convert this power to an alternate form (e.g., electrical or hydraulic power) for transmission over the conduit 116c to the second CVP 116b. This converted and transmitted power may then be re-converted by the second CVP 116b for mechanical output along a shaft 142. Various known control devices (not shown) may be provided to regulate such conversion, transmission, re-conversion, and so on. Also, in some embodiments, the shaft 142 may support a gear 144 (or other similar component). The gear 144 may be enmeshed with and may transfer power to a gear 146. The gear 144 may also be enmeshed with and may transfer power to a gear 148. Accordingly, power from the second CVP 116b (i.e., CVP power) may be divided between the gear 146 and the gear 148 for transmission to other components as will be discussed in more detail below. The powertrain 106 may further include a variator 150 that represents one example of an arrangement that enables an infinitely variable power transmission between the engine 114 and CVPs 116a, 116b and the output shaft 230. As discussed below, this arrangement further enables the power control system 102 in which mechanical energy from the engine 114 may be used to boost the CVP power in a series mode. Other arrangements of the variator 150, engine 114, and CVPs 116a, 116b may be provided.

In some embodiments, the variator 150 may include at least two planetary gearsets. In some embodiments, the planetary gearset may be interconnected and supported on a common shaft, such as the shaft 136, and the planetary gearsets 152, 160 may be substantially concentric. In other embodiments, the different planetary gearsets 152, 160 may be supported on separate, respective shafts that are nonconcentric. The arrangement of the planetary gearsets may be configured according to the available space within the work vehicle 100 for packaging the powertrain 106.

As shown in the embodiment of FIG. 2, the variator 150 may include a first planetary gearset (i.e., a "low" planetary gearset) 152 with a first sun gear 154, first planet gears and associated carrier 156, and a first ring gear 158. Moreover, the variator 150 may include a second planetary gearset (i.e., a "high" planetary gearset) 160 with a second sun gear 162, second planet gears and associated carrier 164, and a second ring gear 166. The second planet gears and carrier 164 may be directly attached to the first ring gear 158. Also, the second planet gears and carrier 164 may be directly attached to a shaft 168 having a gear 170 fixed thereon. Moreover, the second ring gear 166 may be directly attached to a gear 172. As shown, the shaft 168, the gear 170, and the gear 172 may each receive and may be substantially concentric to the shaft 136. Although not specifically shown, it will be appreciated that the powertrain 106 may include various bearings for supporting these components concentrically. Specifically, the shaft 168 may be rotationally attached via a bearing to the shaft 136, and the gear 172 may be rotationally attached via another bearing on the shaft 168.

On the opposite side of the variator 150 (from left to right in FIG. 2), the gear 148 may be mounted (e.g., fixed) on a shaft 174, which also supports the first and second sun gears 154, 162. In some embodiments, the shaft 174 may be hollow and may receive the shaft 136. A bearing (not shown) may rotationally support the shaft 174 on the shaft 136 substantially concentrically. Furthermore, the first planet gears and associated carrier 156 may be attached to a gear 176. The gear 176 may be enmeshed with a gear 178, which is fixed to a shaft 180. The shaft 180 may be substantially parallel to and spaced apart from the shaft 136.

As noted above, the powertrain 106 may be configured for delivering power (from the engine 114, the first CVP 116a, and/or the second CVP 116b) to the output shaft 230 or other output component via the transmission 118. The output shaft 230 may be configured to transmit this received power to wheels of the work vehicle 100, to a power take-off (PTO) shaft, to a range box, to an implement, or other component of the work vehicle 100.

The powertrain 106 may have a plurality of selectable modes, such as direct drive modes, split path modes, and series modes. In a direct drive mode, power from the engine 114 may be transmitted to the output shaft 230, and power from the second CVP 116b may be prevented from transferring to the output shaft 230. In a split path mode, power from the engine 114 and the second CVP 116b may be summed by the variator 150, and the summed or combined power may be delivered to the output shaft 230. Moreover, in a series mode, power from the second CVP 116b may be transmitted to the output shaft 230 and power from the engine 114 may be generally prevented from transferring to the output shaft 230. The powertrain 106 may also have different speed modes in one more of the direct drive, split path, and series modes, and these different speed modes may provide different angular speed ranges for the output shaft 230. The powertrain 106 may switch between the plurality of modes to maintain suitable operating efficiency. Furthermore, the powertrain 106 may have one or more forward modes for moving the work vehicle 100 in a forward direction and one or more reverse modes for moving the work vehicle 100 in a reverse direction. The powertrain 106 may implement different modes and speeds, for example, using a control assembly 182. The control assembly 182 may include one or more selectable transmission components. The selectable transmission components may have first positions or states (engaged positions or states), in which the respective device transmits effectively all power from an input component to an output component. The selectable transmission components may also have a second position or states (disengaged positions or states), in which the device prevents power transmission from the input to the output component. The selectable transmission components may have third positions or states (partially engaged or modulated positions or states), in which the respective device transmits only a portion of the power from an input component to an output component. Unless otherwise noted, the term "engaged" refers to the first position or state in which effectively all of the power is transferred, whereas "partially engaged" or "modulated" specifically refers to only the partial transfer of power. The selectable transmission components of the control assembly 182 may include one or more wet clutches, dry clutches, dog collar clutches, brakes, synchronizers, or other similar devices. The control assembly 182 may also include an actuator for actuating the selectable transmission components between the first, second, and third positions.

As shown in FIG. 2, the control assembly 182 may include a first clutch 184, a second clutch 186, a third clutch 188, a fourth clutch 190, and a fifth clutch 192. Also, the control assembly 182 may include a forward directional clutch 194 and a reverse directional clutch 196.

In one example, the first clutch 184 may be mounted and supported on a shaft 198. Also, the first clutch 184, in an engaged position, may engage the gear 146 with the shaft 198 for rotation as a unit. The first clutch 184, in a disengaged position, may allow the gear 146 to rotate relative to the shaft 198. Also, a gear 200 may be fixed to the shaft 198, and the gear 200 may be enmeshed with the gear 170 that is fixed to the shaft 168. The reverse directional clutch 196 may be supported on the shaft 198 (i.e., commonly supported on the shaft 198 with the first clutch 184). The reverse directional clutch 196 may engage and, alternatively, disengage the gear 200 and a gear 202. The gear 202 may be enmeshed with an idler gear 204, and the idler gear 204 may be enmeshed with a gear 206. The forward directional clutch 194 may be supported on gear 206, which is in turn supported on the shaft 136, to selectively engage shaft 168. Thus, the forward directional clutch 194 may be concentric with both the shaft 168 and the shaft 136. The second clutch 186 may be supported on the shaft 180. The second clutch 186 may engage and, alternatively, disengage the shaft 180 and a gear 208. The gear 208 may be enmeshed with a gear 210. The gear 210 may be fixed to and mounted on a countershaft 212. The countershaft 212 may also support a gear 214. The gear 214 may be enmeshed with a gear 216, which is fixed to the output shaft 230.

The third clutch 188 may be supported on a shaft 218. The shaft 218 may be substantially parallel and spaced at a distance from the shaft 180. Also, a gear 220 may be fixed to and supported by the shaft 218. The gear 220 may be enmeshed with the gear 172 as shown. The third clutch 188 may engage and, alternatively, disengage the gear 220 and a gear 222. The gear 222 may be enmeshed with the gear 210. The fourth clutch 190 may be supported on the shaft 180 (in common with the second clutch 186). The fourth clutch 190 may engage and, alternatively, disengage the shaft 180 and a gear 224. The gear 224 may be enmeshed with a gear 226, which is mounted on and fixed to the countershaft 212. Additionally, the fifth clutch 192 may be supported on the shaft 218 (in common with and concentric with the third clutch 188). The fifth clutch 192 may engage and, alternatively, disengage the shaft 218 and a gear 228. The gear 228 may be enmeshed with the gear 226.

The different transmission modes of the powertrain 106 will now be discussed. Like the embodiments discussed above, the powertrain 106 may have at least one at least one split path mode in which power from the engine 114 and one or more of the CVPs 116a, 116b are combined. Also, in some embodiments, the powertrain 106 may additionally have a direct drive mode and/or and at least one generally CVP-only mode (i.e., series mode).

In some embodiments, engaging the first clutch 184 and the second clutch 186 may place the powertrain 106 in a first forward mode. Generally, this mode may be a CVP-only mode (i.e., series mode). In this mode, mechanical power from the engine 114 may flow via the shaft 130, the gear 132, the gear 138, and the shaft 140 to the first CVP 116a. The first CVP 116a may convert this input mechanical power to electrical or hydraulic power and supply the converted power to the second CVP 116b. Also, power from the engine 114 that flows via the shaft 130, the gear 132, and the gear 134 to the shaft 136 is nominally prevented from being input into the variator 150. Moreover, mechanical power from the second CVP 116b may rotate the shaft 142 and the attached gear 144. This CVP power may rotate the gear 148 for rotating the first sun gear 154. The CVP power may also rotate the gear 146, which may transfer across the first clutch 184 to the shaft 198, to the gear 200, to the gear 170, to the shaft 168, to the second planet gears and associated carrier 164, to the first ring gear 158. In other words, in this mode, power from the second CVP 116b may drivingly rotate two components of the variator 150 (the first sun gear 154 and the first ring gear 158), and the power may be summed and re-combined at the first planet gears and associated carrier 156. The re-combined power may transfer via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 230. In some embodiments, the series mode may provide the output shaft 230 with relatively high torque at low angular speed output. Thus, this mode may be referred to as a creeper mode in some embodiments. Furthermore, as will become evident, the first clutch 184 may be used only in this mode; therefore, the first clutch 184 may be referred to as a "creeper clutch". In other words, the second CVP 116b rotates the first sun gear 154 and the first ring gear 158, and the CVP power recombines at the first planet gears and carrier 156 as a result.

In some embodiments, engaging the forward directional clutch 194 and the second clutch 186 may place the powertrain 106 in a first forward directional mode. This mode may be a split path mode in which the variator 150 sums power from the second CVP 116b and the engine 114 and outputs the combined power to the output shaft 230. Specifically, power from the second CVP 116b is transmitted from the shaft 142, to the gear 144, to the gear 148, to the shaft 174, to drive the first sun gear 154. Also, power from the engine 114 is transmitted to the shaft 130, to the gear 132, to the gear 134, to the shaft 136, to the gear 206, through the forward directional clutch 194, to the shaft 168, to the second planet gears and associated carrier 164 to the first ring gear 158. Combined power from the second CVP 116b and the engine 114 is summed at the first planet gears and the associated carrier 156 and is transmitted via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 230.

Additionally, in some embodiments, engaging the forward directional clutch 194 and the third clutch 188 may place the powertrain 106 in a second forward directional mode as a further split path mode. Specifically, power from the second CVP 116b may be transmitted from the shaft 142, to the gear 144, to the gear 148, to the shaft 174, to drive the second sun gear 162. Also, power from the engine 114 is transmitted to the shaft 130, to the gear 132, to the gear 134, to the shaft 136, to the gear 206, through the forward directional clutch 194, to the shaft 168, to the second planet gears and associated carrier 164. Combined power from the second CVP 116b and the engine 114 may be summed at the second ring gear 166, and may be transmitted to the gear 172, to the gear 220, through the third clutch 188, to the gear 222, to the gear 210, to the countershaft 212, to the gear 214, to the gear 216, and ultimately to the output shaft 230.

In addition, in some embodiments, engaging the forward directional clutch 194 and the fourth clutch 190 may place the powertrain 106 in a third forward directional mode as a further split path mode. Specifically, power from the second CVP 116b is transmitted from the shaft 142, to the gear 144, to the gear 148, to the shaft 174, to drive the first sun gear 154. Also, power from the engine 114 is transmitted to the shaft 130, to the gear 132, to the gear 134, to the shaft 136, to the gear 206, through the forward directional clutch 194, to the shaft 168, to the second planet gears and associated carrier 164, to the first ring gear 158. Combined power from the second CVP 116b and the engine 114 is summed at the first planet gears and the associated carrier 156 and is transmitted via the gear 176 and the gear 178 to the shaft 180. Power at the shaft 180 may be transferred across the fourth clutch 190 to the gear 210, to the gear 226, along the countershaft 212, to the gear 214, to the gear 216, and ultimately to the output shaft 230.

Moreover, in some embodiments, engaging the forward directional clutch 194 and the fifth clutch 192 may place the powertrain 106 in a fourth forward directional mode as a further split path mode. Specifically, power from the second CVP 116b may be transmitted from the shaft 142, to the gear 144, to the gear 148, to the shaft 174, to drive the second sun gear 162. Also, power from the engine 114 is transmitted to the shaft 130, to the gear 132, to the gear 134, to the shaft 136, to the gear 206, through the forward directional clutch 194, to the shaft 168, to the second planet gears and associated carrier 164. Combined power from the second CVP 116b and the engine 114 may be summed at the second ring gear 166, and may be transmitted to the gear 172, to the gear 220, through the fifth clutch 192, to the gear 228, to the gear 226, to the countershaft 212, to the gear 214, to the gear 216, and ultimately to the output shaft 230.

The powertrain 106 may also have one or more reverse modes for driving the work vehicle 100 in the opposite (reverse) direction from those modes discussed above. In some embodiments, the powertrain 106 may provide a reverse series mode, which corresponds to the forward series mode discussed above in which the first clutch 184 and the second clutch 186 may be engaged such that the second CVP 116b drives the shaft 142 and the other downstream components in the opposite direction from that described above to move the work vehicle 100 in reverse.

Moreover, the powertrain 106 may have a plurality of split path reverse directional modes. In some embodiments, the powertrain 106 may provide reverse directional modes that correspond to the forward directional modes discussed above; however, the reverse directional clutch 196 may be engaged instead of the forward directional clutch 194 to achieve the reverse modes.

Accordingly, the powertrain 106 may provide a first reverse directional mode by engaging the reverse directional clutch 196 and the second clutch 186. As such, power from the second CVP 116b may be transmitted from the shaft 142, to the gear 144, to the gear 148, to the shaft 174, to drive the first sun gear 154. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200 to the gear 170, to the shaft 168, to the second planet gears and associated carrier 164 to the first ring gear 158. Combined power from the second CVP 116b and the engine 114 may be summed at the first planet gears and the associated carrier 156 and may be transmitted via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 230.

The powertrain 106 may also provide a second reverse directional mode by engaging the reverse directional clutch 196 and the third clutch 188. As such, power from the second CVP 116b may be transmitted from the shaft 142, to the gear 144, to the gear 148, to the shaft 174, to drive the second sun gear 162. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200, to the gear 170, to the shaft 168, to the second planet gears and associated carrier 164. Combined power from the second CVP 116b and the engine 114 may be summed at the second ring gear 166, and may be transmitted to the gear 172, to the gear 220, through the third clutch 188, to the gear 222, to the gear 210, to the countershaft 212, to the gear 214, to the gear 216, and ultimately to the output shaft 230.

In addition, in some embodiments, engaging the reverse directional clutch 196 and the fourth clutch 190 may place the powertrain 106 in a third reverse directional mode. Specifically, power from the second CVP 116b may be transmitted from the shaft 142, to the gear 144, to the gear 148, to the shaft 174, to drive the first sun gear 154. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200, to the gear 170 to the shaft 168, to the second planet gears and associated carrier 164, to the first ring gear 158. Combined power from the second CVP 116b and the engine 114 may be summed at the first planet gears and the associated carrier 156 and may be transmitted via the gear 176 and the gear 178 to the shaft 180. Power at the shaft 180 may be transferred across the fourth clutch 190 to the gear 210, to the gear 226, along the countershaft 212, to the gear 214, to the gear 216, and ultimately to the output shaft 230.

Moreover, in some embodiments, engaging the reverse directional clutch 196 and the fifth clutch 192 may place the powertrain 106 in a fourth reverse directional mode. Specifically, power from the second CVP 116b may be transmitted from the shaft 142, to the gear 144, to the gear 148, to the shaft 174, to drive the second sun gear 162. Also, power from the engine 114 may be transmitted to the shaft 130, to the gear 132, to the gear 134, to the shaft 136, to the gear 206, to the idler gear 204, to the gear 202, through the reverse directional clutch 196, to the gear 200, to the gear 170, to the shaft 168, to the second planet gears and associated carrier 164. Combined power from the second CVP 116b and the engine 114 may be summed at the second ring gear 166, and may be transmitted to the gear 172, to the gear 220, through the fifth clutch 192, to the gear 228, to the gear 226, to the countershaft 212, to the gear 214, to the gear 216, and ultimately to the output shaft 230.

Furthermore, the powertrain 106 may provide one or more direct drive modes, in which power from the engine 114 is transferred to the output shaft 230 and power from the second CVP 116b is prevented from transferring to the output shaft 230. Specifically, engaging the second clutch 186, the third clutch 188, and the forward directional clutch 194 may provide a first forward direct drive mode. As such, power from the engine 114 may transfer from the shaft 130, to the gear 132, to the shaft 136, to the gear 206, through the forward directional clutch 194, to the second planet gears and carrier 164, and to the first ring gear 158. Moreover, with the second and third clutches 186, 188 engaged, the second ring gear 166 and the first planet gears and carrier 156 lock in a fixed ratio to the countershaft 212 and, thus, the output shaft 230. This effectively constrains the ratio of each side of the variator 150 and locks the engine speed directly to the ground speed of the work vehicle 100 by a ratio determined by the tooth counts of the engaged gear train. In this scenario, the speed of the sun gears 154, 162 is fixed and the sun gears 154, 162 carry torque between the two sides of the variator 150. Furthermore, the first CVP 116a and the second CVP 116b may be unpowered.

Similarly, engaging the fourth clutch 190, the fifth clutch 192, and the forward directional clutch 194 may provide a second forward direct drive mode. Furthermore, engaging the second clutch 186, the third clutch 188, and the reverse directional clutch 196 may provide a first reverse direct drive mode. Also, engaging the fourth clutch 190, the fifth clutch 192, and the reverse directional clutch 196 may provide a second reverse direct drive mode. As introduced above, the controller 104 is coupled to control various aspects of the power control system 102, including the engine 114 and transmission 118 to implement the engine throttle shift function.

Figure 3:
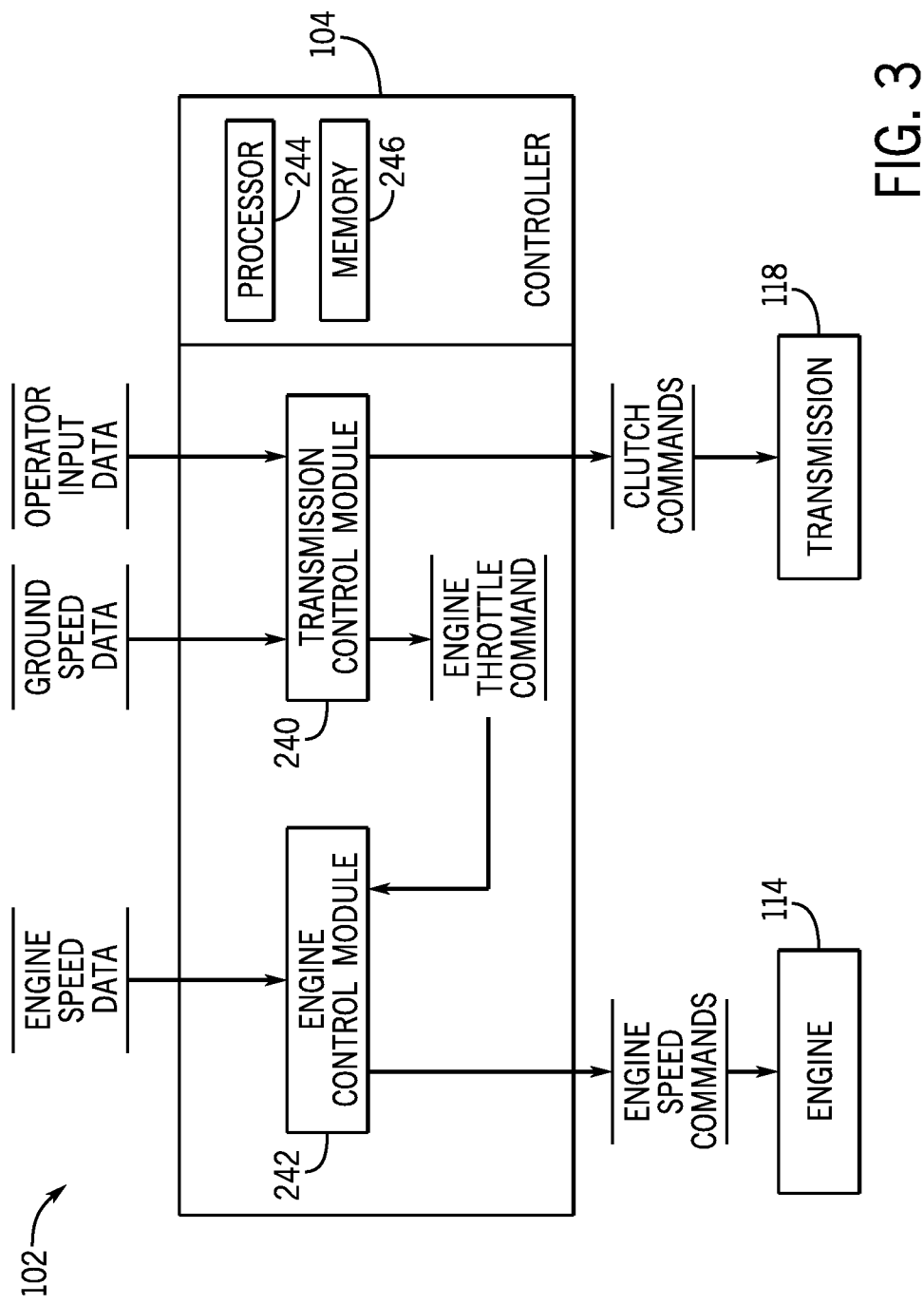
FIG. 3 is a dataflow diagram of a controller of the power control system in accordance with an example embodiment.

Referring now also to FIG. 3, a dataflow diagram illustrates an embodiment of the power control system 102 implemented by the controller 104, engine 114, and transmission 118 to execute the engine throttle shift function. Generally, the controller 104 may be considered a vehicle controller, a dedicated controller, or a combination of engine and/or transmission controllers. With respect to the power control system 102 of FIG. 3, the controller 104 may be organized as one or more functional units or modules 240, 242 (e.g., software, hardware, or combinations thereof). As can be appreciated, the modules 240, 242 shown in FIG. 3 may be combined and/or further partitioned to carry out similar functions to those described herein. As an example, each of the modules 240, 242 may be implemented with processing architecture such as a processor 244 and memory 246, as well as suitable communication interfaces. For example, the controller 104 may implement the modules 240, 242 with the processor 244 based on programs or instructions stored in memory 246. In some examples, the consideration and implementation of the engine throttle shift function by the controller 104 are continuous, e.g., constantly active. In other examples, the activation of the engine throttle shift function may be selective, e.g., enabled or disabled based on input from the operator or other considerations. In any event, the engine throttle function may be enabled and implemented by the power control system 102, as described below.

Generally, the controller 104 may receive input data in a number of forms and/or from a number of sources, including sensors 110, although such input data may also come in from other systems or controllers, either internal or external to the work vehicle 100. This input data may represent any data sufficient to operate the engine 114 and transmission 118, particularly any data sufficient to carry out the engine throttle shift function described below.

In one example, the controller 104 may be considered to include a transmission control module 240 and an engine control module 242. In general, the transmission control module 240 is configured to generate clutch commands to operate the transmission 118 based on various types of data, including ground speed and operator input, as shown. The clutch commands may be generated at "shift points" in which the commands result in the clutches (e.g., clutches 184, 184, 188, 190, 192, 194, 196 of FIG. 2) of the transmission 118 providing a new gear or speed ratio at the output (e.g., shaft 230 of FIG. 2). Such operation may be implemented based on one or more shift schedules stored in memory 246.

In general, the engine control module 242 may generate commands to operate the engine 114, including commands associated with the typical operations of the engine 114, such as air and fuel commands, ignitions, shut downs, timings, etc. In particular, the engine control module 242 generates an engine speed command for the engine. The engine speed command may be based on a number of factors, including operational parameters and operator input via the operator interface 122 (FIG. 1), as well as the current and intended mode or gear ratio commanded by the transmission control module 240. In some example, the engine speed commands may be generated based on a predetermined operational schedule stored in memory 246.

As described below, the engine control module 242 (and/or the transmission control module 240) may implement the engine throttle shift function to improve the shift quality at one or more of the shift points. During typical operation (e.g., without the engine throttle shift function), the engine control module 242 commands an engine speed that may be higher than the current engine speed, particularly when the transmission is being upshifted by the transmission control module 240, in order to achieve a desired target speed for the intended mode.

However, at certain shift points, attempting to increase engine speed may result in non-synchronous speeds at the clutch elements within the transmission 118. In some situations, the impact of these disparate speeds is exacerbated at shift points in which the transmission 118 has high internal inertia. The internal inertia may be reflected from the transmission 118 at the engine 114 to, in effect, spike the speed of the engine 114, which will then be transferred back through the transmission 118 to the output. In other words, without implementation of the engine throttle shift function discussed below, the transmission 118 may experience lugging and a spike in acceleration that impacts the shift quality and is noticeable with respect to performance and feel.

As such, the transmission control module 240 may store or otherwise determine the shift points at which the engine throttle shift function should be implemented. As introduced above, the shift points selected for the engine throttle shift function are those that would otherwise tend to fail to account for excess internal inertia within the transmission 118. In one example, a selected shift point associated with the engine throttle shift function may include a shift point in which the transmission 118 transitions from a series mode (e.g., in which the transmission 118 transfer power only from one or both of the CVPs 116a, 116b) to a split path mode (e.g., in which the transmission 118 combines power from the engine 114 and one or more of the CVPs 116a, 116b). In effect, this shift point "adds" the power from the engine 114 into and through the transmission 118. Other shift points may also be selected for implementation of the engine throttle shift function. In one example, the selected shift points may be predetermined and stored as part of the shift schedule, although other mechanisms for identifying the appropriate shift points for the engine throttle shift function may be provided. In some examples, all shift points may be executed with the engine throttle shift function.

In any event, upon initiation of a selected shift points associated with the engine throttle shift function, the transmission control module 240 generates an engine throttle command for the engine control module 242 (in addition to the clutch commands to execute the change in gear ratio within the transmission 118). In response, the engine control module 242 generates the engine speed commands according to the engine throttle shift function.

In one example, the engine control module 242 generates the engine speed command according to the engine throttle shift function based on the actual or current engine speed. In particular, the engine control module 242 may generate the engine speed command according to the engine throttle shift function to be equal to the current engine speed. By setting the commanded engine speed to the current engine speed, the engine 114 is "throttled" or effectively de-fueled temporarily to avoid an increase in engine speed during the shift. As a result, the internal inertia within the transmission 118 is not reflected between the engine 114 and the output of the transmission 118 to result in acceleration or spikes in speed that would otherwise impact shift quality, performance, and feel. Upon completion of the shift (e.g., upon full engagement of the designated clutches), the engine throttle shift function may be terminated and the commanded engine speed may be set to increase according to the nominal schedule. Additional details regarding the throttling of the engine 114 and the resulting impact on the transmission 118 during the shifting are provided below with reference to FIGS. 4A and 4B.

Reference is now made to FIGS. 4A and 4B, which are data representations 250, 270 depicting operation of the powertrain 106 without the engine throttle shift function (FIG. 4A) and with the engine throttle shift function (FIG. 4B), respectively. The data representations 250, 270 reflect a change in gear ratio between a first transmission mode and a second transmission mode.

Referring initially to FIG. 4A, the data representation 250 depicts various types of speeds, indicated on the first (or left) vertical axis 252 for the engine 114 and on the second (or right) vertical axis 254 as the output speed, as a function of time, indicated on the horizontal axis 256. The data representation 250 includes a first line 258 depicting the commanded engine speed over time; a second line 260 depicting the current engine speed over time; and a third line 262 depicting the output speed (e.g., output shaft 230) over time. In the particular data representation 250 of FIG. 4A, the time period on the horizontal axis 256 reflects the period before, after, and during a shift point, reflected by the vertical line 264, e.g., transitioning between a first transmission mode and a second transmission mode. In one example, the shift point 264 may occur at a transition from a series mode to a split mode.

As noted above, the data representation 250 of FIG. 4A depicts operation of the power control system 102 without implementation of the engine throttle shift function. As shown, the commanded engine speed 258 remains constant through the shift point 264. In particular, the commanded engine speed 258 is independent of the current engine speed 260.

Generally, the current engine speed 260 and the output speed 262 in FIG. 4A reflect operation of the powertrain 106 as the work vehicle 100 increases speed such that a gear change within the transmission 118 is appropriate at the shift point 264. As shown, the transition at the shift point 264 results in the current engine speed 260 jumping to an elevated value, which in turn results in the output speed 262 also jumping. In effect, the current engine speed 260 and the output speed 262 have temporary accelerations at the shift point 264. These temporary accelerations may be noticeable by the operator and negatively impact performance and feel. As introduced above, the acceleration of current engine speed 260 and resultant acceleration of output speed 262 may be the result of reflected inertia within the transmission 118. Subsequent to the initial accelerations at the shift point 264, the current engine speed 260 returns to the commanded engine speed 258 and the output speed 262 resumes a constant acceleration.

Referring now to FIG. 4B, the data representation 270 depicts a similar scenario to that of the data representation 250, except that the engine throttle shift function is implemented. As such, the data representation 270 reflects engine speed on the first (or left) vertical axis 272, output speed on the second (or right) vertical axis 274, and time on the horizontal axis 276. As above, the data representation 270 includes a first line 278 depicting the commanded engine speed over time; a second line 280 depicting the current engine speed over time; and a third line 282 depicting the output speed (e.g., output shaft 230) over time, particularly during the period before, after, and during a shift point, reflected by the vertical line 284, e.g., transitioning between a first transmission mode and a second transmission mode.

As noted above, the data representation 270 of FIG. 4B depicts operation of the power control system 102 with the implementation of the engine throttle shift function. As shown, the commanded engine speed 278 remains constant to the shift point 264. At the shift point 264, the commanded engine speed 278 is set to the current engine speed 280.

This results in the current engine speed 280 smoothly increasing at a constant rate to the desired speed (e.g., approximately 1400 rpms) instead of spiking beyond the desired speed as occurred in the data representation 250 of FIG. 4A. Moreover, the output speed 282 maintains a smooth increase throughout the transition between transmission modes. In effect, the engine throttle shift function accommodates or mitigates any reflected inertia within the transmission so as not to impact performance and feel.

The power control system discussed herein may further be embodied as a method for controlling a powertrain of a work vehicle. In particular, the method includes initiating, with a controller, a transition for the transmission between a first transmission mode and a second transmission mode at a first shift point associated with an engine throttle shift function; determining, at the controller, a current engine speed; and generating and executing, at the controller, an engine speed command for the engine such that a commanded engine speed is a function of the current engine speed in accordance with the engine throttle shift function upon the transition of the transmission at the first shift point. As noted above, the method may include generating and executing the engine speed command such that the commanded engine speed is approximately equal to the current engine speed. In one example, the method includes initiating the transition for the transmission such that, in the first transmission mode, the transmission drives the output shaft with power solely from the at least one motor and, in the second transmission mode, the transmission drives the output shaft with power combined from the at least one motor and the engine. In effect, the engine speed command is generated and executed such that the engine is de-fueled during the transition of the transmission at the first shift point. Upon completion of the transition of the transmission at the first shift point, the method operates to generate and execute a further engine speed command such that the commanded engine speed is greater than the current engine speed, e.g., without the engine throttle shift function.

Accordingly, the present disclosure provides a power control system and method for a work vehicle powertrain having an engine and at least one motor generating power conditioned by a transmission such as an eIVT. In particular, the power control system and method provide improved shift quality, performance, and feel by accommodating excess internal energy within the transmission.]

Also, the following examples are provided, which are numbered for easier reference.

1. A control system for a work vehicle comprising: a power source including an engine and at least one motor configured to generate power; a transmission including a plurality of clutches coupled together and configured for selective engagement to transfer the power from the engine and the at least one motor to drive an output shaft of a powertrain of the work vehicle according to a plurality of transmission modes; and a controller coupled to the power source and the transmission, the controller having a processor and memory architecture configured to: initiate a transition for the transmission between a first transmission mode and a second transmission mode at a first shift point associated with an engine throttle shift function; determine a current engine speed; and generate and execute an engine speed command for the engine such that a commanded engine speed is a function of the current engine speed in accordance with the engine throttle shift function upon the transition of the transmission at the first shift point.

2. The control system of example 1, wherein the controller is configured to generate and execute the engine speed command such that the commanded engine speed is approximately equal to the current engine speed.

3. The control system of example 1, wherein the controller is configured to initiate the transition for the transmission such that, in the first transmission mode, the transmission drives the output shaft with power solely from the at least one motor and, in the second transmission mode, the transmission drives the output shaft with power combined from the at least one motor and the engine.

4. The control system of example 1, wherein the controller is configured to, upon completion of the transition of the transmission at the first shift point, generate and execute a further engine speed command such that the commanded engine speed is greater than the current engine speed.

5. The control system of example 1, wherein the controller is configured to generate and execute the engine speed command such that the current engine speed does not increase until after the transition of the transmission at the first shift point.

6. The control system of example 1, wherein the controller is configured to generate and execute the engine speed command such that the engine is de-fueled during the transition of the transmission at the first shift point.

7. The control system of example 1, wherein the controller is further configured, subsequent to the transition of the transmission at the first shift point, to: initiate a further transition for the transmission between the second transmission mode and a third transmission mode at a second shift point that is not associated with the engine throttle shift function; and generate and execute a further engine speed command for the engine such that the commanded engine speed is greater than the current engine speed during the transition of the transmission at the second shift point.

8. The control system of example 1, wherein the transmission is an electrical infinitely variable transmission (eIVT).

9. A controller for a work vehicle with an engine and at least one motor configured to generate power and a transmission configured to transfer the power from the engine and the at least one motor to drive an output shaft of the work vehicle, the controller comprising: a processor and memory architecture configured to: initiate a transition for the transmission between a first transmission mode and a second transmission mode at a first shift point associated with an engine throttle shift function; determine a current engine speed; and generate and execute an engine speed command for the engine such that a commanded engine speed is a function of the current engine speed in accordance with the engine throttle shift function upon the transition of the transmission at the first shift point.

10. The controller of example 9, wherein the processor and memory are further configured to generate and execute the engine speed command such that the commanded engine speed is approximately equal to the current engine speed.

11. The controller of example 9, wherein the processor and memory are further configured to initiate the transition for the transmission such that, in the first transmission mode, the transmission drives the output shaft with power solely from the at least one motor and, in the second transmission mode, the transmission drives the output shaft with power combined from the at least one motor and the engine.

12. The controller of example 9, wherein the processor and memory are further configured to, upon completion of the transition of the transmission at the first shift point, generate and execute a further engine speed command such that the commanded engine speed is greater than the current engine speed.

13. The controller of example 9, wherein the processor and memory are further configured to generate and execute the engine speed command such that the current engine speed does not increase until after the transition of the transmission at the first shift point.

14. The controller of example 9, wherein the processor and memory are further configured to generate and execute the engine speed command such that the engine is de-fueled during the transition of the transmission at the first shift point.

15. The controller of example 9, wherein the processor and memory are further configured, subsequent to the transition at the first shift point, to: initiate a further transition for the transmission between the second transmission mode and a third transmission mode at a second shift point that is not associated with the engine throttle shift function; and generate and execute a further engine speed command for the engine such that the commanded engine speed is greater than the current engine speed during the transition of the transmission at the second shift point.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

For convenience of notation, "component" may be used herein, particularly in the context of a planetary gear set, to indicate an element for transmission of power, such as a sun gear, a ring gear, or a planet gear carrier. Further, references to a "continuously" variable transmission, power train, or power source will be understood to also encompass, in various embodiments, configurations including an "infinitely" variable transmission, power train, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As will be appreciated by one skilled in the art, certain aspects of the disclosed subject matter can be embodied as a method, system (e.g., a work machine control system included in a work machine), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

As will be appreciated by one skilled in the art, aspects of the disclosed subject matter can be described in terms of methods, systems (e.g., control or display systems deployed onboard or otherwise utilized in conjunction with work machines), and computer program products. With respect to computer program products, in particular, embodiments of the disclosure may consist of or include tangible, non-transitory storage media storing computer-readable instructions or code for performing one or more of the functions described throughout this document. As will be readily apparent, such computer-readable storage media can be realized utilizing any currently-known or later-developed memory type, including various types of random access memory (RAM) and read-only memory (ROM). Further, embodiments of the present disclosure are open or "agnostic" to the particular memory technology employed, noting that magnetic storage solutions (hard disk drive), solid state storage solutions (flash memory), optimal storage solutions, and other storage solutions can all potentially contain computer-readable instructions for carrying-out the functions described herein. Similarly, the systems or devices described herein may also contain memory storing computer-readable instructions (e.g., as any combination of firmware or other software executing on an operating system) that, when executed by a processor or processing system, instruct the system or device to perform one or more functions described herein. When locally executed, such computer-readable instructions or code may be copied or distributed to the memory of a given computing system or device in various different manners, such as by transmission over a communications network including the Internet. Generally, then, embodiments of the present disclosure should not be limited to any particular set of hardware or memory structure, or to the particular manner in which computer-readable instructions are stored, unless otherwise expressly specified herein.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The term module may be synonymous with unit, component, subsystem, sub-controller, circuitry, routine, element, structure, control section, and the like.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of work vehicles.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for a work vehicle comprising:
a power source including an engine and at least one motor configured to generate power;
a transmission including a plurality of clutches coupled together and configured for selective engagement to transfer the power from the engine and the at least one motor to drive an output shaft of a powertrain of the work vehicle according to a plurality of transmission modes; and
a controller coupled to the power source and the transmission, the controller having a processor and memory architecture configured to:
initiate a transition for the transmission between a first transmission mode and a second transmission mode at a first shift point associated with an engine throttle shift function;
determine a current engine speed; and
generate and execute an engine speed command for the engine such that a commanded engine speed is a function of the current engine speed in accordance with the engine throttle shift function upon the transition of the transmission at the first shift point;
wherein the controller is configured to initiate the transition for the transmission such that, in the first transmission mode, the transmission drives the output shaft with power solely from the at least one motor and, in the second transmission mode, the transmission drives the output shaft with power combined from the at least one motor and the engine.

2. The control system of claim 1, wherein the controller is configured to generate and execute the engine speed command such that the commanded engine speed is approximately equal to the current engine speed.

3. The control system of claim 1, wherein the controller is configured to, upon completion of the transition of the transmission at the first shift point, generate and execute a further engine speed command such that the commanded engine speed is greater than the current engine speed.

4. The control system of claim 1, wherein the controller is configured to generate and execute the engine speed command such that the engine is de-fueled during the transition of the transmission at the first shift point.

5. The control system of claim 1, wherein the controller is further configured, subsequent to the transition of the transmission at the first shift point, to:
initiate a further transition for the transmission between the second transmission mode and a third transmission mode at a second shift point that is not associated with the engine throttle shift function; and
generate and execute a further engine speed command for the engine such that the commanded engine speed is greater than the current engine speed during the transition of the transmission at the second shift point.

6. The control system of claim 1, wherein the transmission is an electrical infinitely variable transmission (eIVT).

7. A controller for a work vehicle with an engine and at least one motor configured to generate power and a transmission configured to transfer the power from the engine and the at least one motor to drive an output shaft of the work vehicle, the controller comprising:
a processor and memory architecture configured to:
initiate a transition for the transmission between a first transmission mode and a second transmission mode at a first shift point associated with an engine throttle shift function;
determine a current engine speed; and
generate and execute an engine speed command for the engine such that a commanded engine speed is a function of the current engine speed in accordance with the engine throttle shift function upon the transition of the transmission at the first shift point;
wherein the processor and memory are further configured to, upon completion of the transition of the transmission at the first shift point, generate and execute a further engine speed command such that the commanded engine speed is greater than the current engine speed.

8. The controller of claim 7, wherein the processor and memory are further configured to generate and execute the engine speed command such that the commanded engine speed is approximately equal to the current engine speed.

9. The controller of claim 7, wherein the processor and memory are further configured to initiate the transition for the transmission such that, in the first transmission mode, the transmission drives the output shaft with power solely from the at least one motor and, in the second transmission mode, the transmission drives the output shaft with power combined from the at least one motor and the engine.

10. The controller of claim 7, wherein the processor and memory are further configured to generate and execute the engine speed command such that the current engine speed does not increase until after the transition of the transmission at the first shift point.

11. The controller of claim 7, wherein the processor and memory are further configured, subsequent to the transition at the first shift point, to:
initiate a further transition for the transmission between the second transmission mode and a third transmission mode at a second shift point that is not associated with the engine throttle shift function; and generate and execute a further engine speed command for the engine such that the commanded engine speed is greater than the current engine speed during the transition of the transmission at the second shift point.

12. A method of operating a powertrain of a work vehicle with an engine and at least one motor configured to generate power and a transmission configured to transfer the power from the engine and the at least one motor to drive an output shaft of the work vehicle, the method comprising:

initiating, with a controller, a transition for the transmission between a first transmission mode and a second transmission mode at a first shift point associated with an engine throttle shift function;

determining, at the controller, a current engine speed;

generating and executing, at the controller, an engine speed command for the engine such that a commanded engine speed is a function of the current engine speed in accordance with the engine throttle shift function upon the transition of the transmission at the first shift point; and upon completion of the transition of the transmission at the first shift point, generating and executing a further engine speed command such that the commanded engine speed is greater than the current engine speed.

13. The method of claim 12, wherein the generating and executing step includes generating and executing the engine speed command such that the commanded engine speed is approximately equal to the current engine speed.

14. The method of claim 12, wherein the initiating step includes initiating the transition for the transmission such that, in the first transmission mode, the transmission drives the output shaft with power solely from the at least one motor and, in the second transmission mode, the transmission drives the output shaft with power combined from the at least one motor and the engine.

15. The method of claim 12, wherein the generating and executing step includes generating and executing the engine speed command such that the engine is de-fueled during the transition of the transmission at the first shift point.

16. A control system for a work vehicle comprising:

a power source including an engine and at least one motor configured to generate power;

a transmission including a plurality of clutches coupled together and configured for selective engagement to transfer the power from the engine and the at least one motor to drive an output shaft of a powertrain of the work vehicle according to a plurality of transmission modes; and a controller coupled to the power source and the transmission, the controller having a processor and memory architecture configured to:

initiate a transition for the transmission between a first transmission mode and a second transmission mode at a first shift point associated with an engine throttle shift function;

determine a current engine speed; and generate and execute an engine speed command for the engine such that a commanded engine speed is a function of the current engine speed in accordance with the engine throttle shift function upon the transition of the transmission at the first shift point;

wherein the controller is configured to generate and execute the engine speed command such that the current engine speed does not increase until after the transition of the transmission at the first shift point.

17. A controller for a work vehicle with an engine and at least one motor configured to generate power and a transmission configured to transfer the power from the engine and the at least one motor to drive an output shaft of the work vehicle, the controller comprising:

a processor and memory architecture configured to:

initiate a transition for the transmission between a first transmission mode and a second transmission mode at a first shift point associated with an engine throttle shift function;

determine a current engine speed; and generate and execute an engine speed command for the engine such that a commanded engine speed is a function of the current engine speed in accordance with the engine throttle shift function upon the transition of the transmission at the first shift point;

wherein the processor and memory are further configured to generate and execute the engine speed command such that the engine is de-fueled during the transition of the transmission at the first shift point.

* * * * *